UNITED STATES PATENT OFFICE.

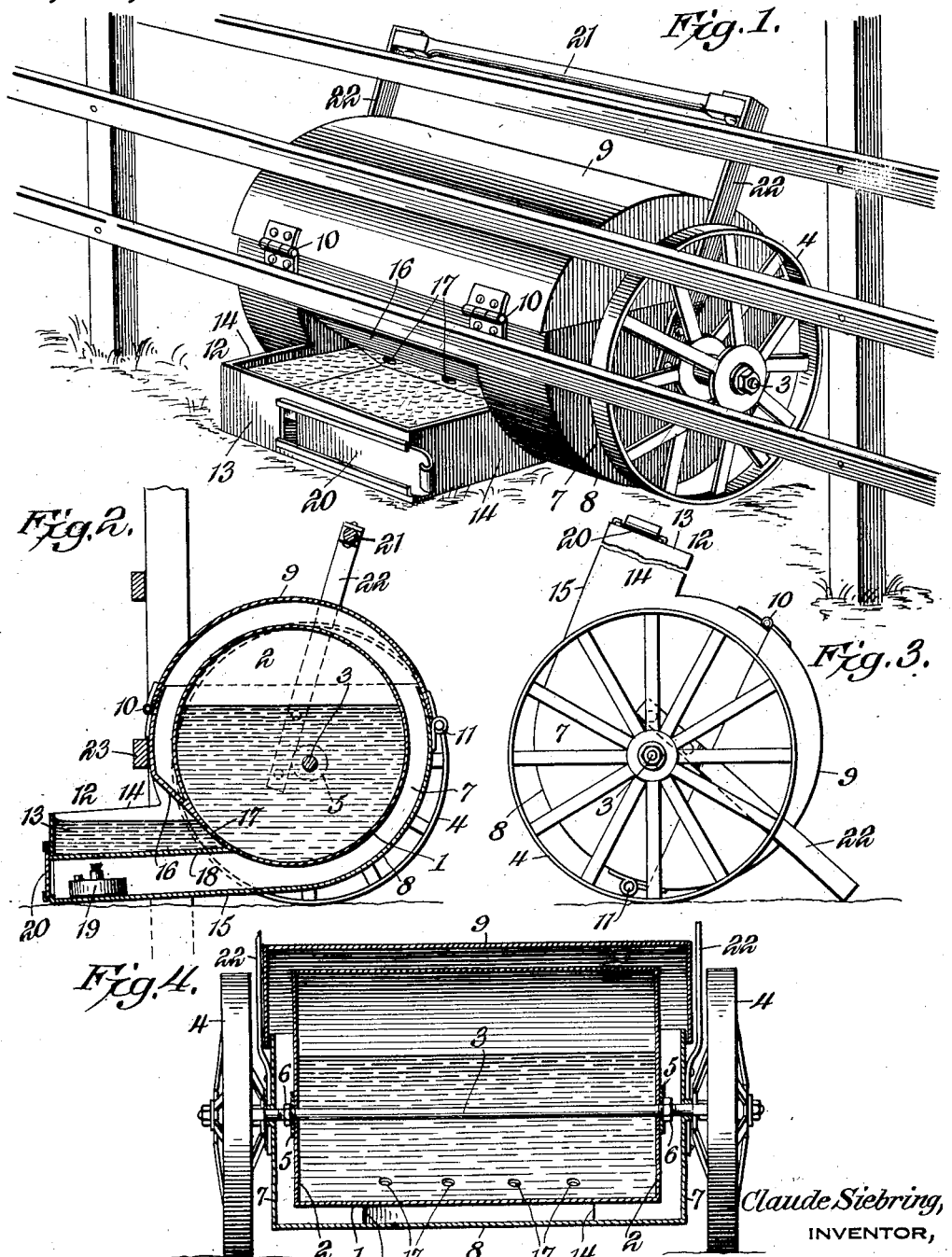

CLAUDE SIEBRING, OF GEORGE, IOWA.

PORTABLE HOG-FOUNTAIN.

1,340,085.

Specification of Letters Patent.

Patented May 11, 1920.

Application filed June 10, 1919. Serial No. 303,030.

*To all whom it may concern:*

Be it known that I, CLAUDE SIEBRING, a citizen of the United States, residing at George, in the county of Lyon and State of Iowa, have invented a new and useful Portable Hog-Fountain, of which the following is a specification.

This invention relates to stock watering devices and particularly to a portable device mounted on wheels or runners.

The object is to provide a device of this character which may be easily transported from place to place, say from a well or other filling point to a place where the water may be easily reached and consumed by the stock, the device including carrying wheels eccentrically mounted, whereby, upon a simple movement of an operating or push handle, the water receptacle may be lifted to clear the ground in order to facilitate such transportation.

Another object is to provide such a device with an extended or offset drinking trough which may be projected through a fence or inclosure and beneath the bottom rail thereof, to lie in a position supported on the ground and easily accessible to the stock confined on that side of the fence or pen.

A further object is to provide a watering device of this class with means for maintaining an even temperature of the water during cold weather, thus preventing freezing of the same and insuring at all times a plentiful supply of drinking water for the stock.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed or modified, so long as such changes or modifications mark no material departure from the salient features of the invention as specifically pointed out in the appended claims.

In the drawing, in which similar reference characters designate corresponding parts throughout the several figures:—

Figure 1 is a perspective view of the improved watering device shown in position for use by stock confined within a pen or inclosure.

Fig. 2 is a vertical transverse sectional view of the same.

Fig. 3 is a side elevation of the device in the position of refilling the tank.

Fig. 4 is a longitudinal sectional view through the water receptacle and its inclosing hood and showing the manner of mounting the same eccentrically upon the axle of the supporting wheels.

The stock waterer of the present invention is designed principally for use where different groups of stock are confined in separate pens, and where it is necessary to carry the water for their consumption. In the ordinary method of watering stock under these conditions, it becomes necessary for the attendant to enter the said pen for the purpose of cleaning out the watering trough before replenishing the supply therein. This operation entails a loss of time besides being a disagreeable duty, and might prove a dangerous one, through attacks by vicious animals within the pen.

The improved waterer overcomes all these objectionable features of caring for stock by incorporating in a single device the drinking trough and tank or water receptacle with means for easily transporting the same to a well or other filling point, and by simply turning the tank or receptacle partially upon its axis, may be supported by the handle in a filling position. When sufficient water has been poured in, the device is righted and wheeled to the desired position, upon the outside of the fence or inclosure, with the projecting drinking trough extending beneath the bottom rail thereof, when by releasing the push handle, the said trough is lowered to rest upon the ground and is held from being pushed out of position by the animals.

The watering device or fountain consists of a cylindrical tank or water receptacle 1, closed at each end by the water-tight heads 2—2. This tank or receptacle may be of any diameter and length to hold the desired quantity of water, depending upon the kind of stock to be served.

An axle 3 extends throughout the length of the receptacle 1, traversing the heads 2—2, and extending beyond the same a sufficient distance to receive the hubs of supporting wheels or runners 4—4, in spaced relation to the heads 2—2, a water-tight joint being maintained at the points where the said axle passes through the heads by means of resilient washers 5—5, clamped to the heads by nuts 6—6 suitably threaded upon the said axle 3.

The axle 3 also traverses the heads or end walls 7—7 of an outer shell or casing 8 of somewhat larger dimensions than the tank or receptacle 1, the said end walls 7—7 lying adjacent to the inner faces of the hubs of the wheels 4—4 and in spaced relation to the heads 2 of the receptacle 1, thus providing a circumferential channel or chamber around the body of the latter, and vertical channels or passages between each of the heads 2 and 7, for a purpose to be explained.

The casing 8 extends substantially two-thirds the height of the receptacle 1, and is provided at the top with a lid or cover 9 fitting outside the casing 8 and secured to the same, on the front thereof, by hinges 10—10, which permit of the upward and forward swinging of the said lid, a suitable locking device 11 being located at the opposite or rear side of the same to hold the said lid in closed position.

The axle 3 is eccentrically mounted in the heads 2 and 7 being located below and to the rear of the center of the same, as clearly illustrated in the drawing, and the peripheries of the wheels 4—4, which are of appropriate diameter, are thus extended below the bottom wall of the casing 8, and the natural tendency of the receptacle and casing is to fall forward, so as to bring a tangentially arranged drinking trough 12 into contact with the ground, where it will be maintained while in use.

The drinking trough 12 comprises a front wall 13 and side walls 14—14 and a bottom wall 15, which latter is arranged tangentially to the bottom wall of the casing 8 and inclined slightly downward with its outer end, where joined to the front wall 13, resting on the ground. The drinking trough 12 is not as long as the casing 8, the latter having an inclined wall 16 extending from end to end of the drinking trough 12 and running backwardly and joined tangentially to the bottom wall of the water receptacle 1 in an opposite direction to the tangential bottom wall 15. This inclined wall 16 is provided with a plurality of apertures 17 communicating with the interior of the receptacle.

An intermediate wall 18 is arranged between the ends of the trough and extends from the receptacle 1 to the front wall 13 of said trough and in spaced relation to the bottom wall 15 to form a bottom wall for the drinking water, which will flow through the apertures 17 and fill the basin formed as described in the upper portion of the extended drinking trough, until the level of the water covers the said apertures, when the flow will cease until the drinking stock have lowered the said level, when the supply will be automatically started again, in a well-known manner. The intermediate wall separates the upper water compartment of the trough from the lower heating compartment.

The space below the trough bottom 18, and between it and the wall 15, communicates with the circumferential space or chamber surrounding the receptacle 1, and is designed to receive a small oil-burner 19 or any other desired heating device, to prevent the water in the drinking trough from freezing in cold weather. It will be seen that the heat generated by the same will pass entirely around the water receptacle 1 and also prevent freezing of the contents of the same, the lid 9 being slightly raised, if desired, to facilitate the passage of said heat.

A sliding door 20 suitably mounted on the front wall 13 of the drinking trough 12 permits of the introduction and the lighting of the lamp 19. A suitable handle 21 consisting of a cross bar, co-extensive with the casing 8 is secured to the outer faces of the heads 7—7 by radial arms 22—22, extending through the centers of said heads and upwardly and rearwardly and joined to the terminals of the handle bar 21.

From the foregoing it will be seen that a simple, cheaply manufactured and efficient portable watering device has been provided. The device may easily be filled, when placed in the position illustrated in Fig. 3 of the drawing, with the handle resting upon the ground, and by righting the device to a position with the forward end of the extended drinking trough 12 slightly elevated above the ground, the same may be readily wheeled to the desired location, when the said trough 12 may be shoved beneath the bottom rail 23 of the fence or pen within easy reach of the stock, said trough 12, upon releasing the handle bar 21, falling to a resting position on the ground and preventing the accidental dislodgement of the device.

What I claim is:—

1. A stock watering device comprising a receptacle, wheels upon which the receptacle is eccentrically mounted, and a drinking trough projecting from the receptacle in offset relation thereto with the outer end of the trough resting upon the ground, the extent of projection of the trough from the receptacle being sufficient to permit the trough to project through a fence at the bottom, so as to be accessible to stock at one side of the fence, the receptacle bearing against the other side of the fence.

2. A stock watering device comprising a receptacle, an axle eccentric thereto, wheels on the ends of the axle at each end of the receptacle, and a drinking trough communicating with the interior of the receptacle and projecting therefrom.

3. A stock watering device comprising a receptacle, an axle and wheels upon which said receptacle is eccentrically mounted, said wheels maintaining the receptacle above the ground and a drinking trough communicating with the interior of the receptacle and arranged tangentially thereof and adapted to be supported at its outer end upon the ground in advance of the wheels.

4. A stock watering device comprising a receptacle, an axle and wheels upon which the same is eccentrically mounted, a drinking trough in offset relation to the receptacle and communicating with the same and having an open top, said trough being adapted to be projected through the rails of a fence or pen and rest upon the ground when in use so as to be accessible to stock at one side of the fence, the receptacle coming in contact with the fence at the other side.

5. A stock watering device comprising a receptacle, an axle and wheels on which said receptacle is mounted, a drinking trough offset from the receptacle and communicating therewith and having an open top, and a rigid handle projecting from the receptacle for elevating the trough to an upstanding position and adapted to rest on the ground for supporting the device in such position when filling the receptacle through the trough.

6. A stock watering device comprising a receptacle, an axle and wheels on which the same is eccentrically mounted, a drinking trough arranged tangentially to the said receptacle and having an open top and adapted to be projected through the rails of a fence or pen and to rest upon the ground when in use, said trough being of less length than the receptacle and accessible to stock at one side of the fence, the tank bearing against the fence at the other side.

7. A stock watering device comprising a receptacle, a casing surrounding the receptacle, supporting wheels for the device eccentrically mounted with respect to the receptacle and casing, a trough projecting from the casing, and a handle fixed to the casing, the device being supported with the trough resting on the ground and the handle in a raised position or else with the trough uppermost and the handle resting on the ground.

8. A stock watering device comprising a cylindrical receptacle, a casing surrounding the same and spaced from both the periphery and the ends of said receptacle, supporting wheels upon which the receptacle and its casing are mounted, and a drinking trough in projecting relation to the receptacle and communicating with the same, said drinking trough comprising an upper water compartment and a lower compartment for heating the water in the upper compartment, the heating compartment being formed by an extension of the casing and by the bottom of the water compartment.

9. A stock watering device comprising a cylindrical receptacle having heads at each end, a cylindrical casing having heads and spaced from both the periphery and the heads of the receptacle except at one point, a drinking trough communicating with the receptacle at that point and comprising water and heating compartments, means for communicating with the interior of the heating compartment, the latter having communication with the space between the receptacle and the casing, means connected with the casing whereby the device may be tilted, and supporting wheels upon which the receptacle and casing are eccentrically mounted.

10. A stock watering device comprising a cylindrical water receptacle having heads at each end, an axle eccentrically mounted in the heads and arranged longitudinally of the receptacle, carrying wheels mounted on the ends of the axle, a casing having end heads and a hinged cover, said casing being mounted on the axle in circumferentially spaced relation to the water receptacle, a tangentially disposed drinking trough extending from the bottom of the casing and having an upper water basin open at the top and communicating with the interior of the water receptacle, and a lower compartment for the reception of a heat generating device and communicating with the circumferential space between the receptacle and the casing.

11. A stock watering device comprising a cylindrical water receptacle having heads at each end, an axle eccentrically mounted in the heads and arranged longitudinally of the receptacle, carrying wheels mounted on the ends of the axle, a casing having end heads and a hinged cover, said casing being mounted on the axle in circumferentially spaced relation to the water receptacle, a tangentially disposed drinking trough extending from the bottom of the casing and having an upper water basin open at the top and communicating with the interior of the water receptacle, and a lower compartment for the reception of a heat generating device and communicating with the circumferential space between the receptacle and the casing, said trough being adapted to project through the rails of a fence or pen and to rest upon the ground when in use, and a handle for elevating the trough to an upstanding position for filling and adapted to rest on the ground to support the device in such position.

12. A stock watering device comprising a receptacle substantially cylindrical in form, a casing surrounding the receptacle and coaxial therewith, an axle eccentric to the receptacle and casing, wheels mounted on the axle, and a drinking trough communicating with the receptacle.

13. A stock watering device comprising a cylindrical receptacle, a cylindrical casing surrounding the receptacle in spaced coaxial relation, supporting wheels for the device eccentrically mounted with respect to the receptacle and casing, a trough projecting from the casing and in communication with the receptacle, and a handle fixed to the casing, the device being supported with the trough resting on the ground and the handle in a raised position or else with the trough uppermost and the handle resting on the ground, the axis of eccentricity in either position of the device being on the same side of the axis of the receptacle and casing as the supporting element whereby either position is one of stable equilibrium.

14. A stock watering device comprising a receptacle, an axle and wheels on which said receptacle is mounted, said axle being eccentric with respect to the receptacle, a casing surrounding the receptacle and spaced therefrom to provide an air chamber, and a drinking trough having an upper water compartment and a lower heating compartment, said water compartment communicating with the receptacle and said heating compartment communicating with the air chamber.

15. A stock watering device comprising a receptacle, an axle and wheels upon which the same is eccentrically mounted, a drinking trough in offset relation to the receptacle, and communicating with the same and having an open top, said trough being adapted to be projected through the rails of a fence and rest upon the ground when in use, and means for swinging the receptacle on its axis, said means holding the device in equilibrium while the receptacle is being filled.

In testimony, that I claim the foregoing as my own, I have hereto affixed my signature in the presence of two witnesses.

CLAUDE SIEBRING.

Witnesses:
T. H. JORDAN,
W. C. CALLMANN.